United States Patent
Chia et al.

(10) Patent No.: US 11,325,092 B2
(45) Date of Patent: May 10, 2022

(54) DEVICE FOR GENERATING HYDROGEN GAS

(71) Applicant: HYDROGEN TECH SDN. BHD., Selangor (MY)

(72) Inventors: Chin Yang Chia, Subang Jaya (MY); Yoke Keen Yee, Petaling Jaya (MY); Albert Kok Foo Ng, Subang Jaya (MY)

(73) Assignee: HYDROGEN TECH SDN. BHD., Subang Jaya (MY)

( * ) Notice: Subject to any disclaimer, the term of this patent is extended or adjusted under 35 U.S.C. 154(b) by 321 days.

(21) Appl. No.: 16/605,760

(22) PCT Filed: Apr. 22, 2017

(86) PCT No.: PCT/MY2017/050019
§ 371 (c)(1),
(2) Date: Oct. 16, 2019

(87) PCT Pub. No.: WO2018/194442
PCT Pub. Date: Oct. 25, 2018

(65) Prior Publication Data
US 2021/0129105 A1  May 6, 2021

(51) Int. Cl.
*B01J 19/00* (2006.01)
*C01B 3/06* (2006.01)
(Continued)

(52) U.S. Cl.
CPC .......... *B01J 19/0033* (2013.01); *B01J 4/002* (2013.01); *B01J 4/007* (2013.01); *B01J 19/0013* (2013.01); *B01J 19/26* (2013.01); *C01B 3/065* (2013.01); *H01M 8/04216* (2013.01); *H01M 8/0606* (2013.01); *B01J 2204/002* (2013.01); *B01J 2219/002* (2013.01); *B01J 2219/00051* (2013.01); *B01J 2219/00162* (2013.01); *H01M 2250/20* (2013.01)

(58) Field of Classification Search
CPC .... B01J 8/002; B01J 19/0033; B01J 19/0013; B01J 4/002; B01J 4/007; B01J 7/02; B01J 2204/002; B01J 2219/002; B01J 2219/00222; B01J 2219/00225; B01J 2219/0027; B01J 2219/00229; B01J 2219/00231; B01J 2219/0051; B01J 2219/00162
See application file for complete search history.

(56) References Cited

U.S. PATENT DOCUMENTS 5,702,491 A    12/1997 Long et al.
2001/0027668 A1  10/2001 Donner et al.
(Continued)

FOREIGN PATENT DOCUMENTS

WO    2007-136629 A2    11/2007
WO    WO2017025591    * 2/2017

*Primary Examiner* — Lessanework Seifu
(74) *Attorney, Agent, or Firm* — Maschoff Brennan

(57) ABSTRACT

A device for generating hydrogen gas having two or more storages, each storage storing a reactant or mix of reactants, and each storage coupled to a means of injecting the stored reactant or mix of reactants into a reaction chamber in a controlled manner and at an optimum rate, so that a chemical reaction occurs in the reaction chamber that produces hydrogen gas efficiently.

6 Claims, 2 Drawing Sheets

(51) Int. Cl.
_B01J 4/00_ (2006.01)
_B01J 19/26_ (2006.01)
_H01M 8/04082_ (2016.01)
_H01M 8/0606_ (2016.01)

(56) References Cited

U.S. PATENT DOCUMENTS

| | | | |
|---|---|---|---|
| 2004/0047801 | A1* | 3/2004 | Petillo .................. B01J 7/02 |
| | | | 423/657 |
| 2005/0175868 | A1 | 11/2005 | McClaine et al. |
| 2009/0110974 | A1 | 4/2009 | Yoon et al. |
| 2011/0286913 | A1* | 11/2011 | Lugtigheid .............. B67D 7/04 |
| | | | 423/658.2 |
| 2015/0207160 | A1* | 7/2015 | Masetti-Placci ......... B01J 4/002 |
| | | | 422/162 |

\* cited by examiner

DEVICE FOR GENERATING HYDROGEN GAS

TECHNICAL FIELD

The present invention relates generally to a hydrogen gas generating device and method thereof, and more particularly to such a device and method that generates hydrogen gas by the controlled injection of reactants into a reaction chamber.

BACKGROUND ART

Fuel cell power generation systems generate electricity by a reaction of hydrogen and air, and can power vehicles, machines, and other devices that require a constant supply of electricity. The source hydrogen is generally stored in-situ, which requires cumbersome and costly pressurized tanks. When the application is that of a vehicle or other moving machine, then the problem is extended to the extra weight of and space required for the storage tanks. One solution to this is the on-site generation of hydrogen gas, close to the fuel cells, so that minimal or zero storage of hydrogen gas is required.

Hydrogen gas can be generated via a chemical reaction separating the hydrogen gas from source materials such as chemical hydrides. The chemical hydrides are much safer stored compared to hydrogen gas. Various solutions exist that generate hydrogen gas from hydrides, and most of these use a reaction chamber of some sort that contains a quantity of the chemical hydride. A liquid such as water is then injected into this reaction chamber, and the chemical reaction that ensues produces hydrogen gas.

One problem with these hydrogen gas generating systems is that the reaction chamber in most cases has to be removed once the chemical hydride fuel has been depleted. It is then in some cases re-filled with chemical hydride, and reused. In some cases, however, the costly reaction chamber cannot be reused, and is thrown away. In either of these cases, the replacement of the empty reaction chamber with a full one can be cumbersome and tedious.

In another known solution, the reaction chamber is not removed, but is charged with the reactant on-site. This comes with its own problems, the biggest of which are difficulty in charging the chamber with the reactant, and time required to do so. The time factor is especially pertinent in applications such as passenger vehicles. Waiting more than a few minutes at refilling stations usually makes it unfeasible.

A problem shared by all the above solutions is the difficulty to finely control the chemical reaction. Depending on the geometry of the reaction chamber, the bulk of the chemical hydride changes as it is depleted, thus making the rate of the reaction, and thus the amount of the hydrogen gas produced, difficult to control. Accurate control of the reaction rate is also important in achieving an optimum chemical reaction, and efficient production of hydrogen gas.

SUMMARY OF INVENTION

Technical Problem

In a hydrogen gas generating device via a chemical reaction between two or more reactants, the reaction chamber needs to be continuously replenished with reactants.

In a hydrogen gas generating device via a chemical reaction between two or more reactants, the reaction chamber has limited volume in which to store reactants.

In a hydrogen gas generating device via a chemical reaction between two or more reactants, a pre-filled reaction chamber has limited volume and geometry to produce hydrogen efficiently.

In a hydrogen gas generating device via a chemical reaction between two or more reactants, the costly reaction chamber needs to be preserved.

In a hydrogen gas generating device via a chemical reaction between two or more reactants, the rate of reaction needs to be finely and accurately controlled so that the hydrogen gas is produced efficiently.

In a mobile fuel cell application, storing hydrogen gas is bulky, of limited capacity, and can be dangerous.

Solution to Problem

The present invention seeks to overcome the aforementioned disadvantages by providing a device for generating hydrogen gas having two or more storages, each storage storing a reactant or mix of reactants, and each storage coupled to a means of injecting the stored reactant or mix of reactants into a reaction chamber in a controlled manner and at an optimum rate, so that a chemical reaction occurs in the reaction chamber that produces hydrogen gas efficiently.

The present invention thus relates to the storage of the various source reactants needed for a chemical reaction that produces hydrogen gas, external to a reaction chamber, and then the controlled injection of those materials into the reaction chamber at an optimum rate, so that hydrogen gas is produced efficiently.

This invention also relates to a device for generating hydrogen gas, comprising: a reaction chamber; a first reactant storage containing a first reactant; a second reactant storage containing a second reactant; a means of injecting said first reactant into said reaction chamber; a means of injecting said second reactant into said reaction chamber; a buffer tank for storing said generated hydrogen gas, said buffer tank provided with a pressure sensor for measuring a pressure within said buffer tank; a means of calculating optimal rates of said injection of first reactant into said reaction chamber and said injection of second reactant into said reaction chamber based on said measured pressure inside buffer tank, said optimal rate being that which generates the most said hydrogen gas; and a means of controlling the rates at which said first reactant and said second reactant are injected into said reaction chamber.

In one aspect of this invention, the first reactant is a chemical hydride. The means of injecting the first reactant into the reaction chamber is an injector, such as a pump injector, a screw feeder, or a mechanical actuator. The second reactant is water or steam. The means of injecting said steam into said reaction chamber is a pump and nozzle.

In another aspect of this invention, there is provided a means of measuring a temperature and pressure inside said reaction chamber. This measured temperature and pressure inside reaction chamber can be used either to calculate optimal rates of said injection of first reactant into said reaction chamber and said injection of second reactant into said reaction chamber, or to stop the reaction if said measured temperature and pressure inside reaction chamber reach predetermined levels.

This invention further relates to a device for generating hydrogen gas, comprising: a reaction chamber; a first reactant storage containing a first reactant; a second reactant storage containing a second reactant; a third reactant storage containing a third reactant, a means of injecting said first reactant into said reaction chamber; a means of injecting said second reactant into said reaction chamber; a means of injecting said third reactant into said reaction chamber; a buffer tank for storing said generated hydrogen gas, said buffer tank provided with a pressure sensor for measuring a pressure within said buffer tank; a means of calculating optimal rates of said injection of first reactant into said reaction chamber, said injection of second reactant into said reaction chamber and said injection of third reactant into said reaction chamber based on said measured pressure inside buffer tank, said optimal rate being that which generates the most said hydrogen gas; and a means of controlling the rates at which said first reactant, said second reactant and said third reactant are injected into said reaction chamber.

In one aspect of this invention, the first reactant is a chemical hydride. The means of injecting the first reactant into the reaction chamber is an injector, such as a pump injector, a screw feeder, or a mechanical actuator. The second reactant is a catalyst such as a metal based catalyst, liquid catalyst, or organic catalyst. The third reactant is water or steam. The means of injecting said steam into said reaction chamber is a pump and nozzle.

In another aspect of this invention, there is provided a means of measuring a temperature and pressure inside said reaction chamber. This measured temperature and pressure inside reaction chamber can be used either to calculate optimal rates of said injection of first reactant into said reaction chamber, said injection of second reactant into said reaction chamber and said injection of third reactant into said reaction chamber, or to stop the reaction if said measured temperature and pressure inside reaction chamber reach predetermined levels.

This invention further relates to a device for generating hydrogen gas, comprising: a reaction chamber; a first reactant storage containing a first reactant; a second reactant storage containing a second reactant; a third reactant storage containing a third reactant, a mixing unit for mixing said first reactant and said second reactant; a third reactant injection means, for injecting said third reactant into said reaction chamber; a buffer tank for storing said generated hydrogen gas, said buffer tank provided with a pressure sensor for measuring a pressure within said buffer tank; a means of calculating optimal rates of said mixing of first reactant and second reactant, and said injection of third reactant into said reaction chamber based said measured pressure inside buffer tank, said optimal rate being that which generates the most said hydrogen gas; and a means of controlling the rates at which said first reactant and second reactant are mixed, and said third reactant is injected into said reaction chamber.

In one aspect of this invention, the first reactant is a chemical hydride. The means of injecting the first reactant into the reaction chamber is an injector, such as a pump injector, a screw feeder, or a mechanical actuator. The second reactant is a catalyst such as a metal based catalyst, liquid catalyst, or organic catalyst. The third reactant is water or steam. The means of injecting said steam into said reaction chamber is a pump and nozzle.

In another aspect of this invention, there is provided a means of measuring a temperature and pressure inside said reaction chamber. This measured temperature and pressure inside reaction chamber can be used either to calculate optimal rates of said injection of first reactant into said reaction chamber, said injection of second reactant into said reaction chamber and said injection of third reactant into said reaction chamber, or to stop the reaction if said measured temperature and pressure inside reaction chamber reach predetermined levels.

In another aspect of this invention, there is further provided a filter located after said reaction chamber, said filter adapted to filter out any unwanted by-products from the produced hydrogen gas.

The present invention further relates to a method of generating hydrogen gas comprising the steps of:
a. storing at least two reactants needed for a chemical reaction that produces hydrogen gas, each reactant stored in a reactant storage;
b. injecting each reactant into a reaction chamber, so that hydrogen gas is produced;
c. measuring a pressure value inside a buffer tank; and
d. using said measured pressure value to calculate optimum rates of said injection of each reactant into the reaction chamber.

The present invention further relates to a device for generating hydrogen gas comprising: at least two storages, each storage storing a reactant, and each storage coupled to a means of injecting said stored reactant into a reaction chamber in a controlled manner and at an optimum rate, so that a chemical reaction occurs in the reaction chamber that produces hydrogen gas. There is provided a means of measuring a pressure value inside a buffer tank, which measured pressure value is used to calculate optimum rates of said injection of each reactant into the reaction chamber.

Other objects and advantages will be more fully apparent from the following disclosure and appended claims.

Advantageous Effects of Invention

By storing reactants outside of the reaction chamber, and injecting them into the reaction chamber only when needed, replacement and replenishment of costly reaction chamber becomes unnecessary.

By controlling injection rates of each reactant into reaction chamber based on measured temperature and pressure inside reaction chamber, performance and efficiency of the reaction is maximized, thus making the production of hydrogen gas efficient.

DESCRIPTION OF EMBODIMENTS

Figure 1:
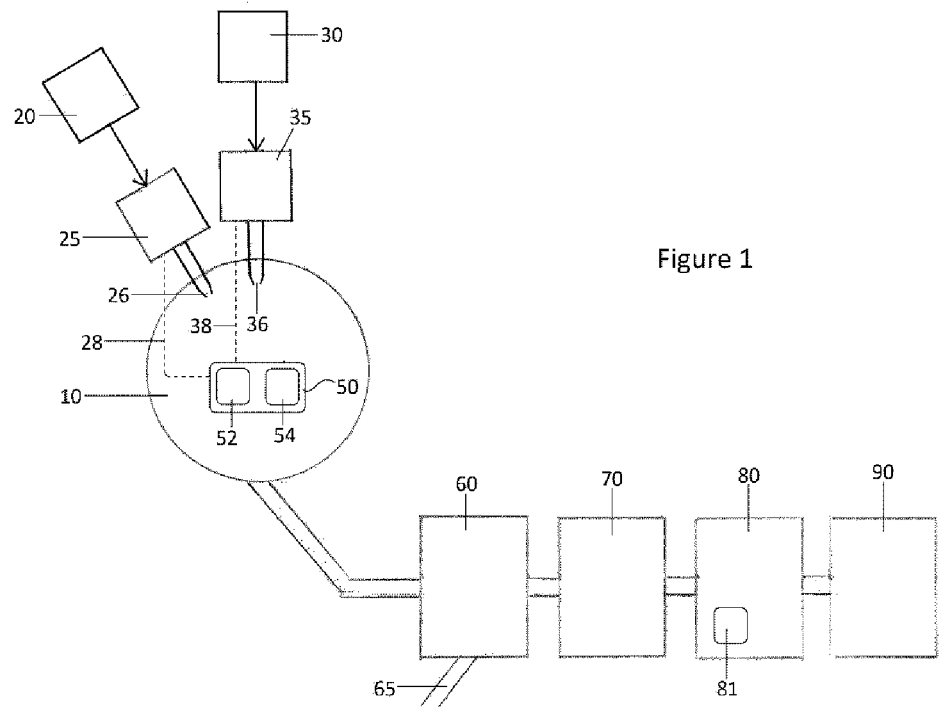
FIG. 1 shows a schematic diagram of a first embodiment of the present invention.

Referring to FIG. 1, there is shown a schematic diagram of a device for generating hydrogen gas in a first embodiment, provided with a reaction chamber (10) designed to contain a chemical reaction that produces hydrogen gas from precursor reactants. The reaction chamber (10) is provided with a pressure sensor (52) and a temperature sensor (54), which are designed to measure a pressure and temperature, respectively, within the reaction chamber (10). There is also provided a first reactant storage (20) designed to store a first reactant, and a second reactant storage (30) designed to store a second reactant. Each of these two reactants is a precursor to a chemical reaction that ultimately produces hydrogen gas. When combined, these reactants undergo a chemical reaction that produces hydrogen gas.

The first reactant storage (20) is connected to a first reactant injection means (25). This first reactant injection means (25) is designed to inject the first reactant into the reaction chamber (10). In this first embodiment, the first reactant is a premixed chemical comprising a mixture of a chemical hydride and a catalyst, such as a metal based catalyst, liquid catalyst, or organic catalyst. The first reactant injection means (25) is an injection means such as a pump injector, screw feeder or mechanical actuator. The first reactant injection means (25) thus injects the premixed chemical into the reaction chamber (10) via a first injection port (26).

The second reactant storage (30) is connected to a second reactant injection means (35). This second reactant injection means (35) is designed to inject the second reactant into the reaction chamber (10). In this first embodiment, the second reactant is water or steam and the second reactant injection means (35) comprises a pump and nozzle. The second reactant injection means (35) thus injects the water or steam into the reaction chamber (10) via a second injection port (36). A further variation to this embodiment is the addition of acid or other additives to the water or steam to enhance the hydrogen gas production.

In this way, the two reactants are injected into the reaction chamber (10), thus initiating the chemical reaction which results in the generation of hydrogen gas and some waste products. The hydrogen gas is separated from the waste products in a filter (60), where the waste products are removed via a waste disposal (65). The hydrogen gas is then pumped via a pump (70) into a buffer tank (80), where it is temporarily stored before being used in a fuel cell (90). The buffer tank (80) is provided with a pressure sensor (81), which is adapted to measure a pressure within the buffer tank (80).

There is also provided a microprocessor (50) which is fed with the said buffer tank pressure measurements from said buffer tank pressure sensor (81). The microprocessor (50) then calculates optimum rates of injection for each of the reactants based on the pressure value within the buffer tank. The optimum rates of reactant injection result in an optimum production of hydrogen gas. The microprocessor (50) sends the calculated optimum rates of injection via a first reactant injection control (28) to the first reactant injection means (25), and via a second reactant injection control (38) to the second reactant injection means (35). In this way, the calculated optimum rates of injection are carried out by the two reactant injection means (25, 35).

The measurements of the said reaction chamber pressure sensor (52) and a temperature sensor (54) is used as a safety feature whereby the hydrogen generation reaction is shut down if the temperature or pressure within the reaction chamber reaches predetermined levels. An upper predetermined reaction chamber pressure is calculated based on the structural integrity of the reaction chamber (10), with the appropriate safety margins. When the sensed pressure within the reaction chamber (10) reaches said upper predetermined pressure, the hydrogen gas generation reaction will be stopped.

In a variation of this first embodiment, the said pressure and temperature measurements within the reaction chamber are also fed to the said microprocessor (50), and are also used to calculate optimum rates of injection for each of the reactants.

Figure 2:
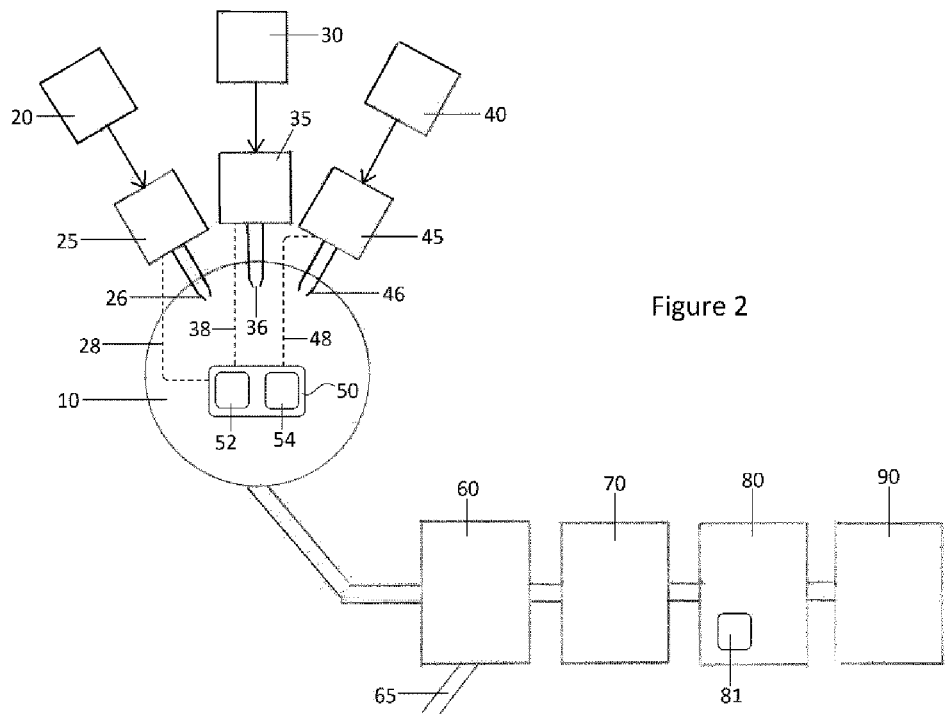
FIG. 2 shows a schematic diagram of a second embodiment of the present invention.

Referring to FIG. 2, there is shown a schematic diagram of a device for generating hydrogen gas in a second embodiment, provided with a reaction chamber (10) designed to contain a chemical reaction that produces hydrogen gas from precursor reactants. The reaction chamber (10) is provided with a pressure sensor (52) and a temperature sensor (54), which are designed to measure a pressure and temperature, respectively, within the reaction chamber (10). There is also provided a first reactant storage (20) designed to store a first reactant, a second reactant storage (30) designed to store a second reactant, and a third reactant storage (40) designed to store a third reactant. Each of these three reactants is a precursor to a chemical reaction that ultimately produces hydrogen gas. When combined, these reactants undergo a chemical reaction that produces hydrogen gas.

The first reactant storage (20) is connected to a first reactant injection means (25). This first reactant injection means (25) is designed to inject the first reactant into the reaction chamber (10). In this second embodiment, the first reactant is a chemical hydride in powder or pellet form, and the first reactant injection means (25) is an injection means such as a pump injector, screw feeder or mechanical actuator. The first reactant injection means (25) thus injects the chemical hydride reactant into the reaction chamber (10) via a first injection port (26).

The second reactant storage (30) is connected to a second reactant injection means (35). This second reactant injection means (35) is designed to inject the second reactant into the reaction chamber (10). In this second embodiment, the second reactant is a catalyst, such as a metal based catalyst, liquid catalyst, or organic catalyst, and the second reactant injection means (35) is a mechanical injection means such as a screw feeder. The second reactant injection means (35) thus injects the catalyst into the reaction chamber (10) via a second injection port (36).

The third reactant storage (40) is connected to a third reactant injection means (45). This third reactant injection means (45) is designed to inject the third reactant into the reaction chamber (10). In this second embodiment, the third reactant is water or steam and the third reactant injection means (45) comprises a pump and nozzle. The third reactant injection means (45) thus injects the water or steam into the reaction chamber (10) via a third injection port (46). A further variation to this embodiment is the addition of acid or other additives to the water or steam to enhance the hydrogen gas production.

In this way, the three reactants are injected into the reaction chamber (10), thus initiating the chemical reaction which results in the generation of hydrogen gas and some waste products. The hydrogen gas is separated from the waste products in a filter (60), where the waste products are removed via a waste disposal (65). The hydrogen gas is then pumped via a pump (70) into a buffer tank (80), where it is temporarily stored before being used in a fuel cell (90). The buffer tank (80) is provided with a pressure sensor (81), which is adapted to measure a pressure within the buffer tank (80).

There is also provided a microprocessor (50) which is fed with the said buffer tank pressure measurements from said buffer tank pressure sensor (81). The microprocessor (50) then calculates optimum rates of injection for each of the reactants based on the pressure value within the buffer tank. The optimum rates of reactant injection result in an optimum production of hydrogen gas. The microprocessor (50) sends the calculated optimum rates of injection via a first reactant injection control (28) to the first reactant injection means (25), via a second reactant injection control (38) to the second reactant injection means (35), and via a third reactant injection control (48) to the third reactant injection means (45). In this way, the calculated optimum rates of injection are carried out by the three reactant injection means (25, 35, 45).

The measurements of the said reaction chamber pressure sensor (52) and a temperature sensor (54) is used as a safety feature whereby the hydrogen generation reaction is shut down if the temperature or pressure within the reaction chamber reaches predetermined levels. An upper predetermined reaction chamber pressure is calculated based on the structural integrity of the reaction chamber (10), with the appropriate safety margins. When the sensed pressure within the reaction chamber (10) reaches said upper predetermined pressure, the hydrogen gas generation reaction will be stopped.

In a variation of this first embodiment, the said pressure and temperature measurements within the reaction chamber are also fed to the said microprocessor (50), and are also used to calculate optimum rates of injection for each of the reactants.

Figure 3:
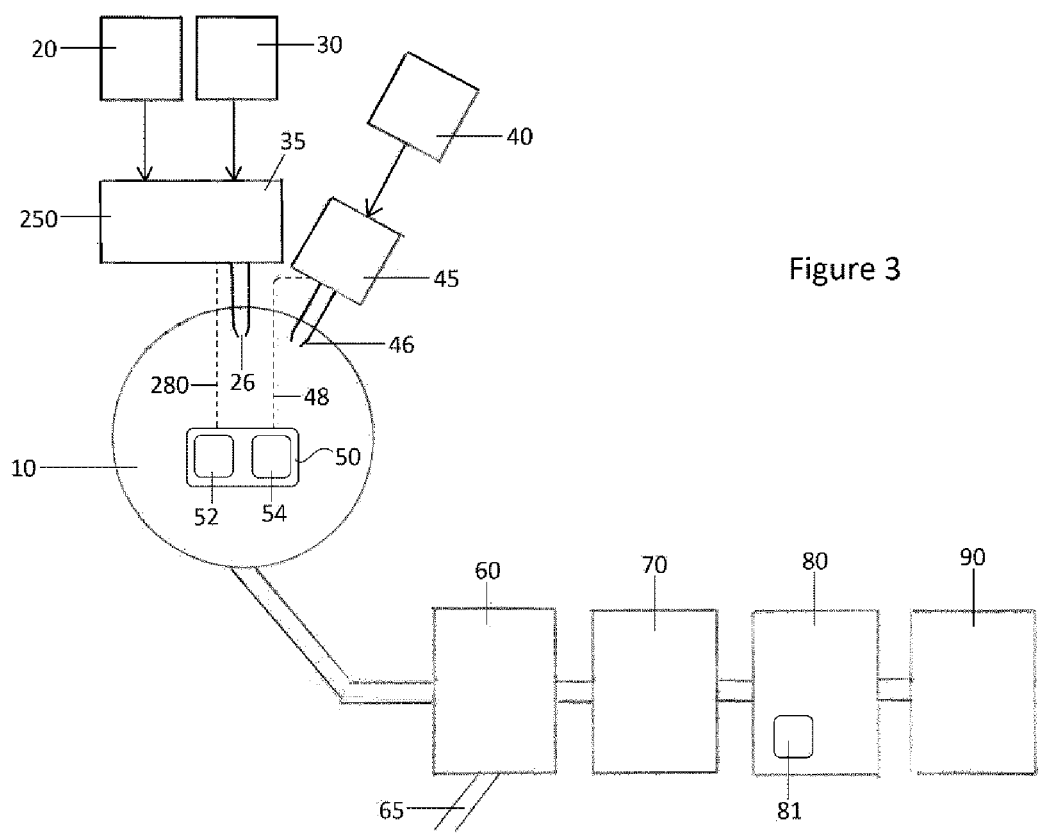
FIG. 3 shows a schematic diagram of a third embodiment of the present invention.

Referring to FIG. 3, there is shown a schematic diagram of a device for generating hydrogen gas in a third embodiment, provided with a reaction chamber (10) designed to contain a chemical reaction that produces hydrogen gas from precursor reactants. The reaction chamber (10) is provided with a pressure sensor (52) and a temperature sensor (54), which are designed to measure a pressure and temperature, respectively, within the reaction chamber (10). There is also provided a first reactant storage (20) designed to store a first reactant, a second reactant storage (30) designed to store a second reactant, and a third reactant storage (40) designed to store a third reactant. Each of these three reactants is a precursor to a chemical reaction that ultimately produces hydrogen gas. When combined, these reactants undergo a chemical reaction that produces hydrogen gas.

In this third embodiment, the first reactant storage (20) and the second reactant storage (30) are connected to a mixing unit (250). In this embodiment, the first reactant is a chemical hydride in powder or pellet form, and the second reactant is a catalyst, such as a metal based catalyst, liquid catalyst, or organic catalyst. The chemical hydride and catalyst are fed into the mixing unit (250), where they are mixed together to form a premixed chemical. This premixed chemical is a precursor to a chemical reaction that generates hydrogen gas. The mixing unit (250) is also designed to inject said premixed chemical into the reaction chamber (10). In this embodiment, this is done with an injection means such as a pump injector, screw feeder or mechanical actuator. The mixing unit (250) thus injects the premixed chemical into the reaction chamber (10) via a first injection port (26).

The third reactant storage (40) is connected to a third reactant injection means (45). This third reactant injection means (45) is designed to inject the third reactant into the reaction chamber (10). In this third embodiment, the third reactant is water or steam and the third reactant injection means (45) comprises a pump and nozzle. The third reactant injection means (45) thus injects the water or steam into the reaction chamber (10) via a third injection port (46). A further variation to this embodiment is the addition of acid or other additives to the water or steam to enhance the hydrogen gas production.

In this way, the three reactants are injected into the reaction chamber (10), thus initiating the chemical reaction which results in the generation of hydrogen gas and some waste products. The hydrogen gas is separated from the waste products in a filter (60), where the waste products are removed via a waste disposal (65). The hydrogen gas is then pumped via a pump (70) into a buffer tank (80), where it is temporarily stored before being used in a fuel cell (90). The buffer tank (80) is provided with a pressure sensor (81), which is adapted to measure a pressure within the buffer tank (80).

There is also provided a microprocessor (50) which is fed with the said buffer tank pressure measurements from said buffer tank pressure sensor (81). The microprocessor (50) in this embodiment calculates optimum rates of mixing the first reactant and second reactant in the mixing unit (250) based on the pressure value within the buffer tank, and sends this to the mixing unit via a mixing unit control (280). The microprocessor (50) in this embodiment also calculates an optimum rate of injecting the third reactant into the reaction chamber (10) based on the pressure value within the buffer tank, and sends this to the third reactant injection means (45) via a third reactant injection control (48). The said optimum rates of mixing and reactant injection result in an optimum production of hydrogen gas.

The measurements of the said reaction chamber pressure sensor (52) and a temperature sensor (54) is used as a safety feature whereby the hydrogen generation reaction is shut down if the temperature or pressure within the reaction chamber reaches predetermined levels. An upper predetermined reaction chamber pressure is calculated based on the structural integrity of the reaction chamber (10), with the appropriate safety margins. When the sensed pressure within the reaction chamber (10) reaches said upper predetermined pressure, the hydrogen gas generation reaction will be stopped.

In a variation of this first embodiment, the said pressure and temperature measurements within the reaction chamber are also fed to the said microprocessor (50), and are also used to calculate optimum rates of injection for each of the reactants.

In all the above embodiments, the chemical hydride includes, but is not limited to any of the following: sodium borohydride, boron hydride, nitrogen hydride, carbon hydride, chemical hydride, boron nitrogen hydride, boron carbon hydride, nitrogen carbon hydride, metal boron hydride, metal nitrogen hydride, metal carbon hydride, metal boron nitrogen hydride, metal boron carbon hydride, metal carbon nitrogen hydride, boron nitrogen carbon hydride, metal boron nitrogen carbon hydride, NaH, LiBH4, LiH, CaH2, Ca(BH4)2, MgBH4, KBH4, Al(BH3)3, or the combination thereof.

In all the above embodiments, the catalyst includes, but is not limited to any of the following: a cobalt based oxide, a boride, a solid acid, a salt, or a combination thereof. The salt can be a compound of the ions of any of: ruthenium (Ru), cobalt (Co), nickel (Ni), copper (Cu), iron (Fe) or a combination thereof.

REFERENCE SIGNS LIST

1. Reaction chamber (10)
2. First Reactant Storage (20)
3. First Reactant Injection Means (25)
4. Mixing Unit (250)
5. First Injection Port (26)
6. First Reactant Injection Control (28)
7. Mixing Unit Control (280)
8. Second Reactant Storage (30)
9. Second Reactant Injection Means (35)
10. Second Injection Port (36)
11. Second Reactant Injection Control (38)
12. Third Reactant Storage (40)
13. Third Reactant Injection Means (45)
14. Third Injection Port (46)

15. Third Reactant Injection Control (48)
16. Microprocessor (50)
17. Pressure Sensor (52)
18. Temperature Sensor (54)
19. Filter (60)
20. Waste Disposal (65)
21. Pump (70)
22. Buffer tank (80)
23. Buffer tank Pressure Sensor (81)
24. Fuel Cell (90)

The invention claimed is:

1. A device for generating hydrogen gas, comprising:
a reaction chamber;
a first reactant storage containing a first reactant, said first reactant being a solid hydride;
a second reactant storage containing a second reactant,
a third reactant storage containing a third reactant;
a mixing unit for mixing said first reactant and said second reactant;
a third reactant injection means, for injecting said third reactant into said reaction chamber;
wherein the reactants are injected into the reaction chamber, thus initiating a chemical reaction which results in the generation of hydrogen gas;
a means of measuring a temperature and pressure inside said reaction chamber wherein said measured temperature and pressure inside reaction chamber are used to calculate optimal rates of an injection of first reactant into said reaction chamber and an injection of second reactant into said reaction chamber;
a buffer tank for storing said generated hydrogen gas, said buffer tank provided with a pressure sensor for measuring a pressure within said buffer tank;
a means of calculating optimal rates of said mixing of first reactant and second reactant, and said injection of third reactant into said reaction chamber based said measured pressure inside buffer tank; and
a means of controlling the rates at which said first reactant and second reactant are mixed, and said third reactant is injected into said reaction chamber,
wherein the said optimal rates of injection of first and second reactants result in an optimum production of hydrogen gas.

2. A device for generating hydrogen gas according to claim 1, wherein the said first reactant is a chemical hydride.

3. A device for generating hydrogen gas according to claim 1, wherein the said second reactant is a catalyst.

4. A device for generating hydrogen gas according to claim 1, wherein the said third reactant is water.

5. A device for generating hydrogen gas according to claim 4, wherein the said third reactant is steam.

6. A device for generating hydrogen gas according to claim 4, wherein the means of injecting said third reactant into said reaction chamber is a pump and nozzle.

* * * * *